K. GODDARD.
THILL COUPLING.
No. 74,816. Patented Feb. 25, 1868.
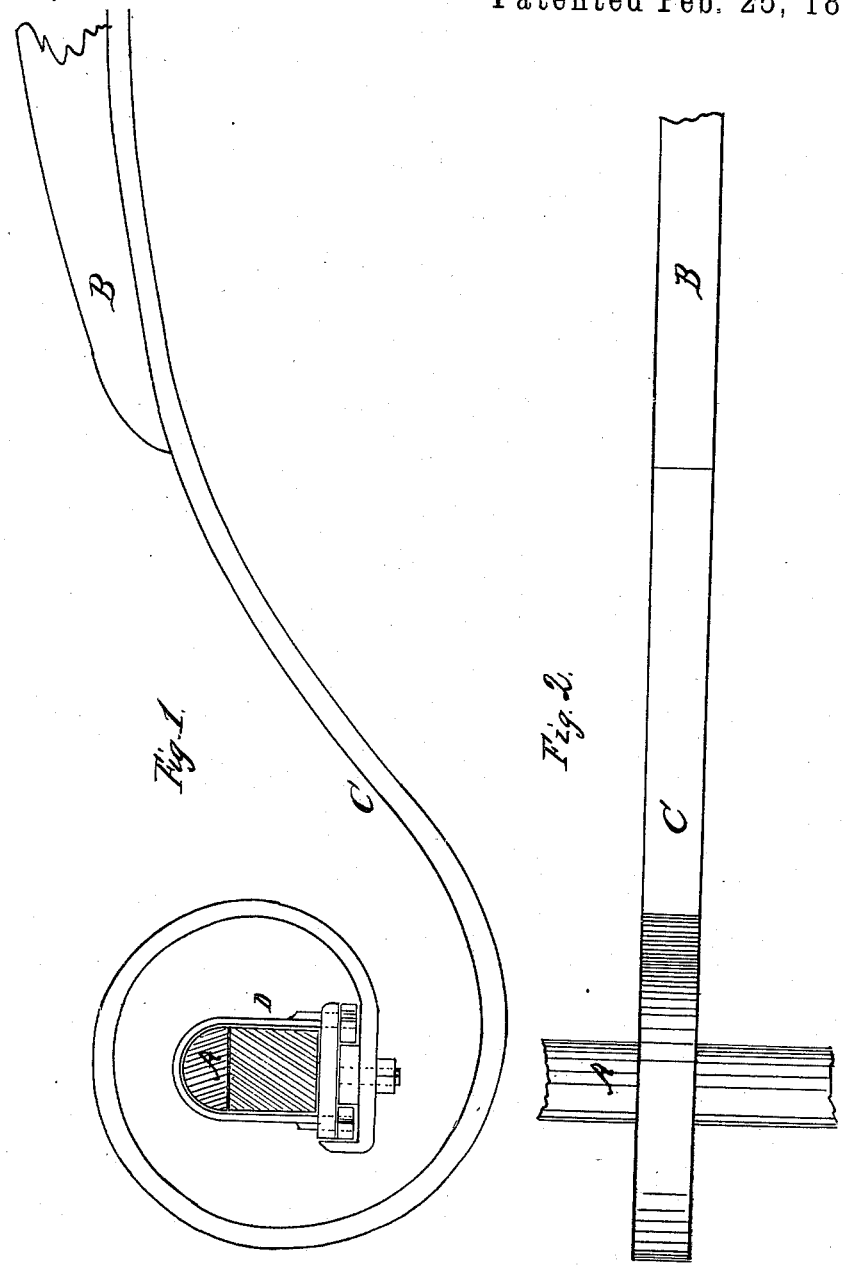

United States Patent Office.

KINGSTON GODDARD, OF RICHMOND, NEW YORK.

Letters Patent No. 74,816, dated February 25, 1868.

IMPROVEMENT IN THILL-COUPLING.

*The Schedule referred to in these Letters Patent and making part of the same.*

TO ALL WHOM IT MAY CONCERN:

Be it known that I, KINGSTON GODDARD, of Richmond, in the county of Richmond, and State of New York, have invented a new and improved Spring-Attachment for Thill-Couplings; and I do hereby declare that the following is a full, clear, and exact description thereof, which will enable those skilled in the art to make and use the same, reference being had to the accompanying drawings, forming part of this specification.

This invention consists in the application of a spring to a thill-coupling in such a manner that the jolting or jarring of the vehicle, and the vertical movement of the front axle caused by the front wheels passing over uneven surfaces or obstructions, will not be communicated in an appreciable degree to the thills of the vehicle, and the horse thereby relieved in the labor of drawing the vehicle, especially in travelling over railroads. In the accompanying sheet of drawings—

Figure 1 is a side view of my invention.
Figure 2, a plan or top view of the same.
Similar letters of reference indicate corresponding parts.

A represents a portion of the front axle of a vehicle; B, the rear end of the thill, and C the thill-iron, which, in this instance, is made of steel, and is bent or curved, so as to extend around underneath the axle up at the rear side, and over the top thereof, and then extend down in front of the axle, so that it may be bolted or otherwise secured to the bottom of a clip, D, as shown clearly in fig. 1.

This curved portion of the thill-iron forms a spring, it being made sufficiently thin and tempered to answer that purpose. This spring relieves the thills of the jolting or sudden vertical vibrations of the front axle caused by the wheels passing over obstructions and uneven surfaces, and greatly relieves the horse in his labor of drawing the vehicle, especially when travelling rapidly over a rough road.

Having thus described my invention, I claim as new, and desire to secure by Letters Patent—

The spring C, secured at one end to the bottom of the clip D, and extending around the axle and clip, secured at its other end to the thill B, forming a spring-coupling, as herein described for the purpose specified.

KINGSTON GODDARD.

Witnesses:
  WM. F. McNAMARA,
  ALEX. F. ROBERTS.